United States Patent
Gillilan

(10) Patent No.: US 9,320,998 B2
(45) Date of Patent: Apr. 26, 2016

(54) COLLAPSIBLE PLEATED FILTER AND FRAME

(71) Applicant: Columbus Industries, Inc., Ashville, OH (US)

(72) Inventor: Chrystal B. Gillilan, London, OH (US)

(73) Assignee: Columbus Industries, Inc., Ashville, OH (US)

(*) Notice: Subject to any disclaimer, the term of this patent is extended or adjusted under 35 U.S.C. 154(b) by 0 days.

(21) Appl. No.: 13/768,300

(22) Filed: Feb. 15, 2013

(65) Prior Publication Data

US 2013/0205732 A1 Aug. 15, 2013

Related U.S. Application Data

(60) Provisional application No. 61/598,950, filed on Feb. 15, 2012.

(51) Int. Cl.
  *B01D 46/00* (2006.01)
  *B01D 46/10* (2006.01)
  *B01D 46/52* (2006.01)

(52) U.S. Cl.
  CPC ........ *B01D 46/0016* (2013.01); *B01D 46/0001* (2013.01); *B01D 46/0005* (2013.01); *B01D 46/10* (2013.01); *B01D 46/521* (2013.01)

(58) Field of Classification Search
  CPC .............. B01D 46/00; B01D 46/0016; B01D 46/0005; B01D 46/0001; B01D 46/10; B01D 46/521
  USPC .............................. 55/490–519; 493/374–393
  See application file for complete search history.

(56) References Cited

U.S. PATENT DOCUMENTS

| | | | |
|---|---|---|---|
| 2,393,419 A | 1/1946 | Schaaf | |
| 3,246,457 A * | 4/1966 | De Baun | B01D 46/0001 210/485 |
| 3,440,807 A | 4/1969 | Gaines, Jr. | |
| 3,793,813 A | 2/1974 | McAllister | |
| 3,938,973 A | 2/1976 | Kershaw | |
| 3,992,173 A | 11/1976 | Wharton et al. | |
| 4,086,071 A | 4/1978 | Champlin | |
| 4,561,587 A | 12/1985 | Wysocki | |
| 4,570,844 A | 2/1986 | Wysocki | |
| 5,252,111 A | 10/1993 | Spencer et al. | |
| 5,273,563 A | 12/1993 | Pasch et al. | |
| 5,273,564 A | 12/1993 | Hill | |
| 5,693,108 A * | 12/1997 | Roome | 55/493 |
| 5,743,927 A | 4/1998 | Osendorf | |
| 5,782,944 A | 7/1998 | Justice | |
| 5,840,094 A | 11/1998 | Osendorf et al. | |

(Continued)

FOREIGN PATENT DOCUMENTS

WO  WO 2005074468 A2 *  8/2005

*Primary Examiner* — Thomas Bennett McKenzie
(74) *Attorney, Agent, or Firm* — Jason H. Foster; Kremblas & Foster

(57) ABSTRACT

A collapsible HVAC filter that includes a pleated filter media pack with ends that attach to ends of a planar filter frame member. The structure collapses by folding the filter frame member along score lines and compressing the pleated filter media while the media and frame member are attached. The collapsed components occupy little space relative to the expanded filter, and can be expanded to form a completed filter with little effort required by the end user. Most of the filter media is collapsed in a generally U-shaped channel formed from the folded filter frame member.

14 Claims, 11 Drawing Sheets

(56) References Cited

U.S. PATENT DOCUMENTS

| | | | |
|---|---|---|---|
| 6,033,453 A | 3/2000 | Weddell, III | |
| 6,264,713 B1 | 7/2001 | Lewis, II | |
| 6,328,778 B1 | 12/2001 | Richerson et al. | |
| 6,502,909 B1 | 1/2003 | Swilik, Jr. et al. | |
| 6,599,343 B2 | 7/2003 | Frederick et al. | |
| 6,652,613 B2 | 11/2003 | Shah et al. | |
| 6,814,773 B2 | 11/2004 | Shah et al. | |
| 7,410,520 B2 | 8/2008 | Nowak et al. | |
| 7,452,396 B2 | 11/2008 | Terlson et al. | |
| 7,497,888 B2 | 3/2009 | Ashwood et al. | |
| 7,537,632 B2 | 5/2009 | Miller et al. | |
| 7,959,699 B2 | 6/2011 | Privitt et al. | |
| 8,157,881 B1 | 4/2012 | Anoszko et al. | |
| 2004/0182055 A1 | 9/2004 | Wynn | |
| 2006/0053759 A1* | 3/2006 | Winters et al. | 55/497 |
| 2007/0204574 A1 | 9/2007 | Workman | |
| 2008/0034718 A1* | 2/2008 | Schuld et al. | 55/495 |
| 2009/0019824 A1 | 1/2009 | Lawrence | |

\* cited by examiner

COLLAPSIBLE PLEATED FILTER AND FRAME

CROSS-REFERENCES TO RELATED APPLICATIONS

This application claims the benefit of U.S. Provisional Application No. 61/598,950 filed Feb. 15, 2012. This prior application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The invention relates generally to commercial and residential heating ventilation and air conditioning (HVAC) filtration, and more specifically to a collapsible filter that is collapsed to reduce shipping volume and is readily constructed by the end user.

Traditional pleated filters for commercial and residential HVAC systems include one or more frame members and a pleated filtration media glued to the frame members. As is known in the field, the filtration media is pleated to provide greater surface area on which to collect particulate. The greater surface area takes longer to clog the pores of the media with particulate, thereby prolonging the life of the filter media. Furthermore, pleated media tends to be stronger than planar media in resisting deformation due to the force of air passing through the media. However, pleated filters occupy a large volume of empty space per filter due to the shape of the pleated media. While such filters have low weight, they tend to be expensive to transport when considering them on a per unit volume basis due to the large amount of empty space per unit volume.

It is known to construct filters of materials that are collapsed by the manufacturer and assembled by end users. Such filters have significantly reduced shipping volumes, but require the end user to expand and construct the finished filter so that it can be used in a conventional manner. Conventional collapsible filters require the filter components to depart significantly from traditional non-collapsible filter components at a significant cost disadvantage. U.S. Pat. No. 3,938,973 discloses such a prior art collapsible filter, and includes a pinch frame furnace filter that requires a combination of framing materials including heavier paperboard, expensive plastic components and/or adhesive for the end user to assemble. There is also a higher tooling cost with the plastic components, because such components lead to less flexibility on filter sizes available.

The need exists for an improved collapsible filter that permits an end user to expand and construct the finished product rapidly, with minimal skill requirements and without the prior art's cost disadvantages.

BRIEF SUMMARY OF THE INVENTION

The invention contemplates a collapsible air filter with a pleated air filter media assembly, a method of collapsing the same, and the collapsed structure. The filter media has generally rectangular panels interconnected together in a pleated configuration with each panel connecting to at least one adjacent panel at longitudinal panel edges. A filter frame member is preferably made from a generally planar blank and has a central area with at least one opening formed therein. The central opening enables airflow through the filter so the air can pass through the media. The blank has laterally opposite side walls and longitudinally opposite end walls that are foldable to positions substantially perpendicular to the central area.

The filter frame member blank preferably has a plurality of substantially parallel score lines extending laterally across the filter frame member to define hinge points for the filter frame member to fold along. The filter frame member is preferably folded, along with the pleated air filter media assembly, to a substantially collapsed condition in which a substantially U-shaped channel is formed in the filter frame member and a majority of the panels of the pleated air filter media assembly are retained in the U-shaped channel. It should be understood that the U-shaped channel can be a different shape, but that a U-shaped channel has advantages.

At least two panels at opposite ends of the pleated air filter media assembly are attached to the end walls of the filter frame member so that, upon expansion of the collapsed filter frame member, the two filter media assembly panels remain attached to the end walls of the filter frame member during simultaneous elongation of the filter frame member and the pleated air filter media assembly.

In a preferred embodiment, a second filter frame member is configured to mount to the filter frame member. The second filter frame member is made from a generally planar blank having a central area with at least one opening formed therein, thereby enabling airflow therethrough. The second filter frame member has laterally opposite side walls and longitudinally opposite end walls foldable to positions substantially perpendicular to the central area, and is foldable to a substantially collapsed condition.

In an alternative embodiment, the air filter has frame panels extending from the end walls and the side walls of the filter frame member. The frame panels are configured to fold over lateral and longitudinal edges of the pleated air filter media assembly to positions substantially parallel to the central area when the air filter is expanded. These frame panels substitute for the second filter frame member to retain the pleated filter media assembly in the filter frame.

The entire filter collapses to a small portion of its original dimensions for smaller shipping volume. Any suitable paperboard frame material, which could be replaced or supplemented by thin stock plastic or other folding, rigid material, will work for the frame member or members. In the embodiment with two filter frame members, one frame member frictionally engages the other to enclose and finish the filter, and tabs extending from one frame member are inserted into slots formed in the other frame member. No plastic components are required to make a filter of suitable structural integrity. Adhesive can be used to attach the frame members to one another. The assembly is simplified and all parts are disposable.

In the preferred embodiment, the pleated media assembly is attached to a filter frame member and the frame member is folded along with, and around, the pleated media. The pleated media assembly can be adhered to the frame member or attached with tape, hooks and loops fasteners, glue or any other fastener. A separate second frame member is folded but does not have pleat media attached, and is packaged with the frame member and pleated media assembly combination. As an alternative, the second frame member can be pre-attached to the first frame member. In another alternative, one or more of the frame members do not cover the entire side walls of the pleated media assembly but only a portion of one or more sides.

The frame member of the preferred embodiment is preferably paperboard that is glued at the corners and scored along lines extending across its width so the frame member folds up with the pleated media assembly mounted in it. The frame members could be made of plastic or any other suitable material. When folded up, a preferably substantially U-shaped region of the frame contains most of the panels of the pleat pack, and the other regions of the frame are folded as shown and described in detail herein to maintain small size and very little air space.

The collapsible filter preferably does not use glue or plastic clips in the assembly, but still results in a structurally strong finished filter product. In addition, all of the components become part of the filter and are easily disposed of. The preferred design in the collapsed form occupies approximately 15% of the volume of the expanded (ready-to-use) filter. This greatly reduces the cost of shipping. As an example, a finished 16×25×4 inch filter collapses to fit into a space of 16×6×2.5 inches. Of course, other finished and collapsed sizes are contemplated and possible.

Figure 1:
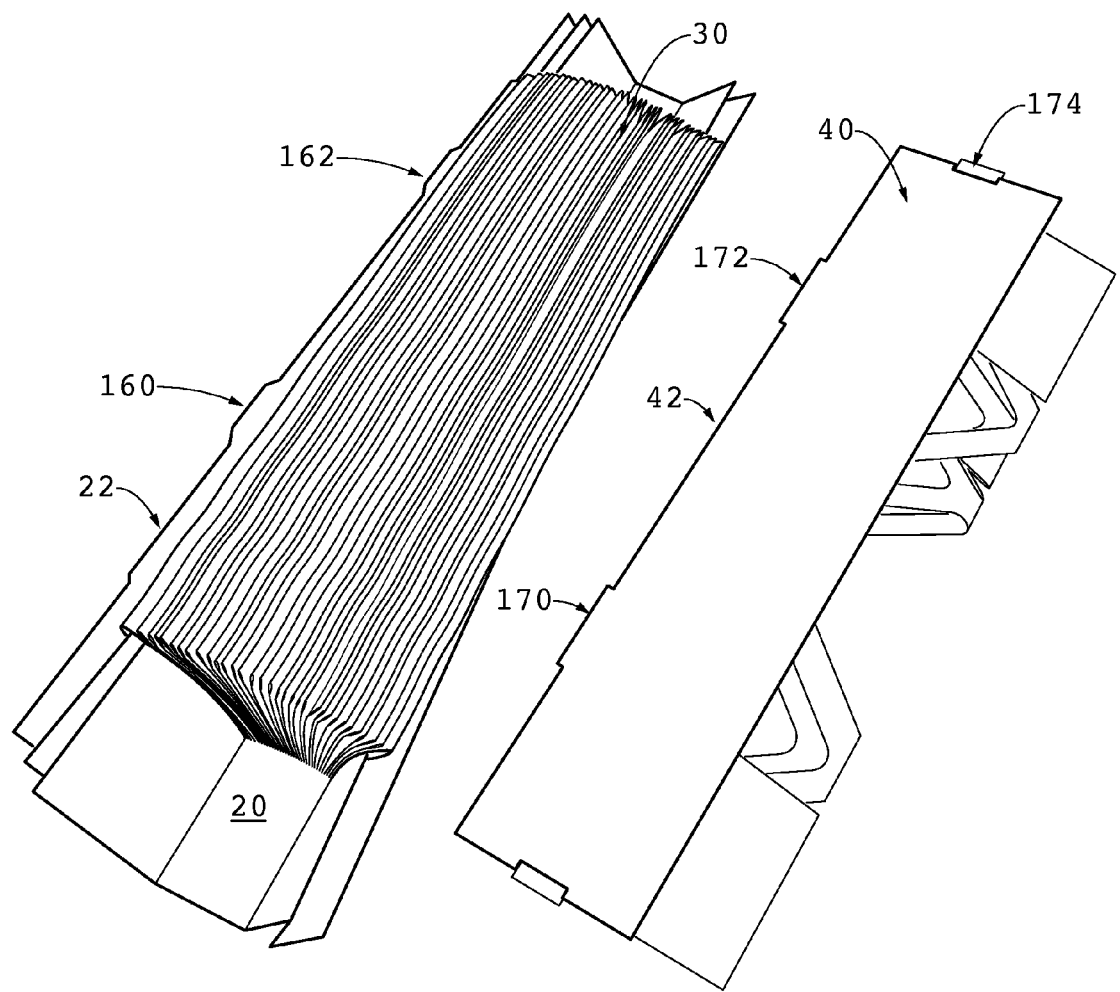
FIG. 1 is a view in perspective illustrating a preferred embodiment of the present invention, including the collapsed frame member with pleated media assembly and collapsed frame member.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word "connected" or terms similar thereto are often used. They are not limited to direct connection, but include connection through other elements where such connection is recognized as being equivalent by those skilled in the art.

DETAILED DESCRIPTION OF THE INVENTION

Provisional patent application Ser. No. 61/598,950 is incorporated by reference into this application.

Figure 15:
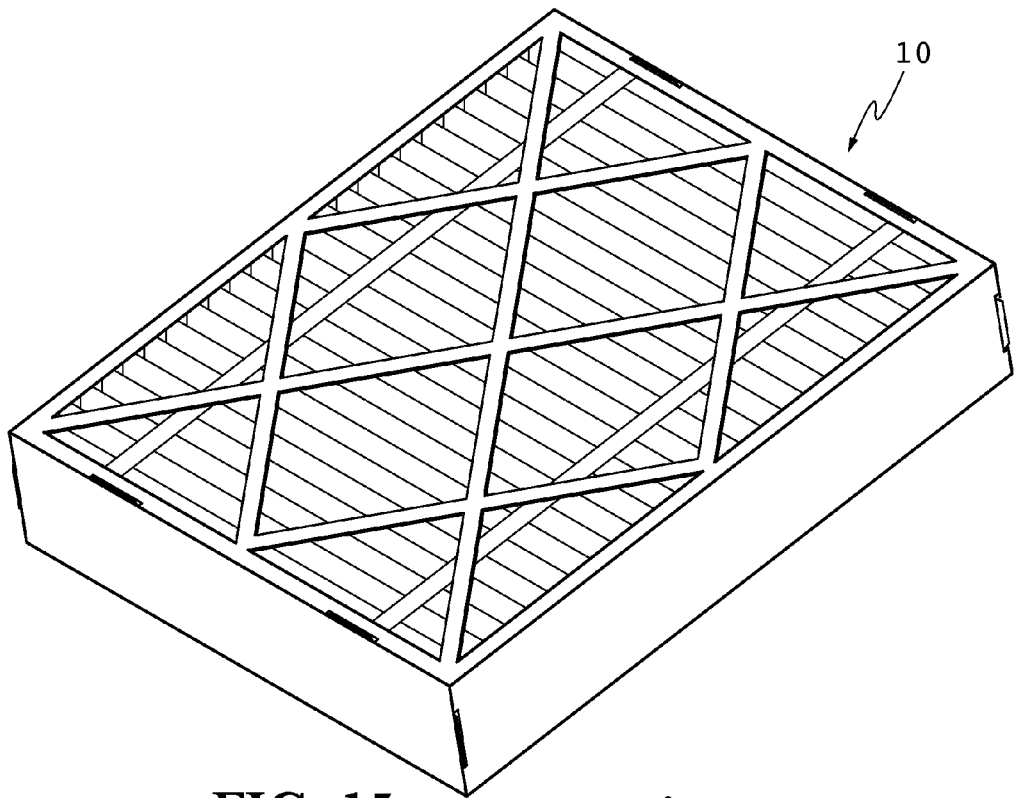
FIG. 15 is a view in perspective illustrating the preferred embodiment in a finished state.
Figure 16:
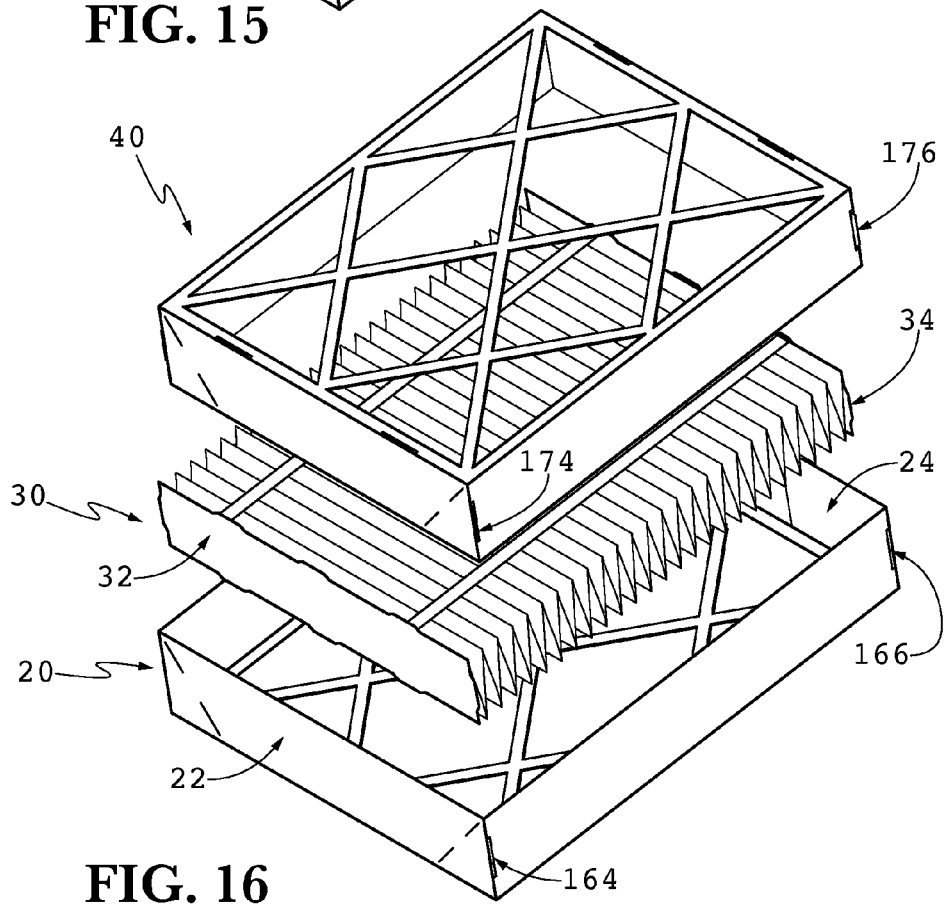
FIG. 16 is an exploded view illustrating the preferred embodiment.

The preferred embodiment of the filter 10 is shown in a finished, assembled state in FIG. 15. The filter 10 of FIG. 15 is illustrated in an exploded view in FIG. 16, showing the frame member 20, the pleated media assembly 30 and the frame member 40. The filter 10 is shown in a collapsed state or condition in FIGS. 1, 2, 3 and 7, and the components thereof will now be described with reference to the illustrations.

Figure 4:
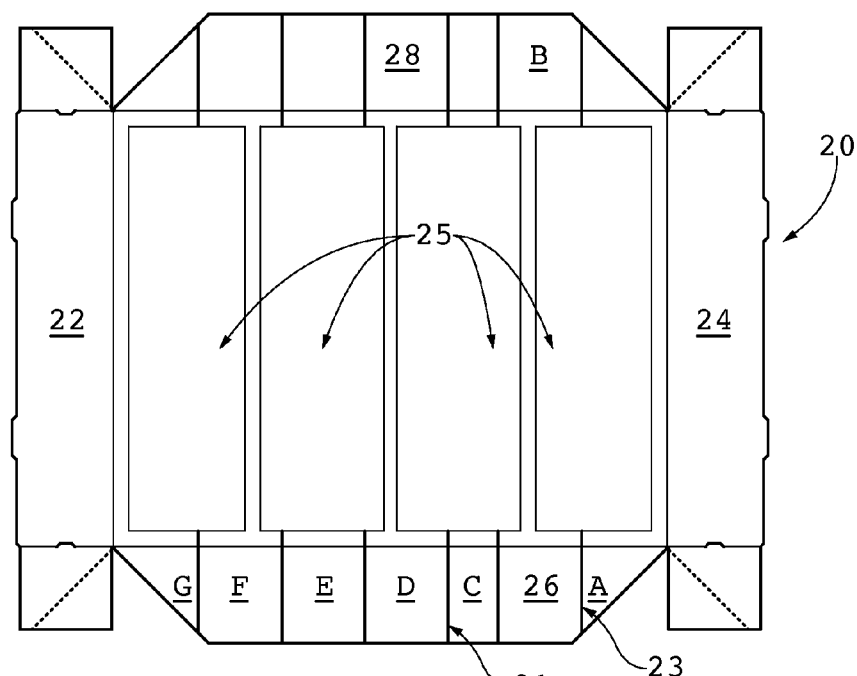
FIG. 4 is a schematic top view illustrating the frame member in a planar, pre-constructed state.
Figure 5:
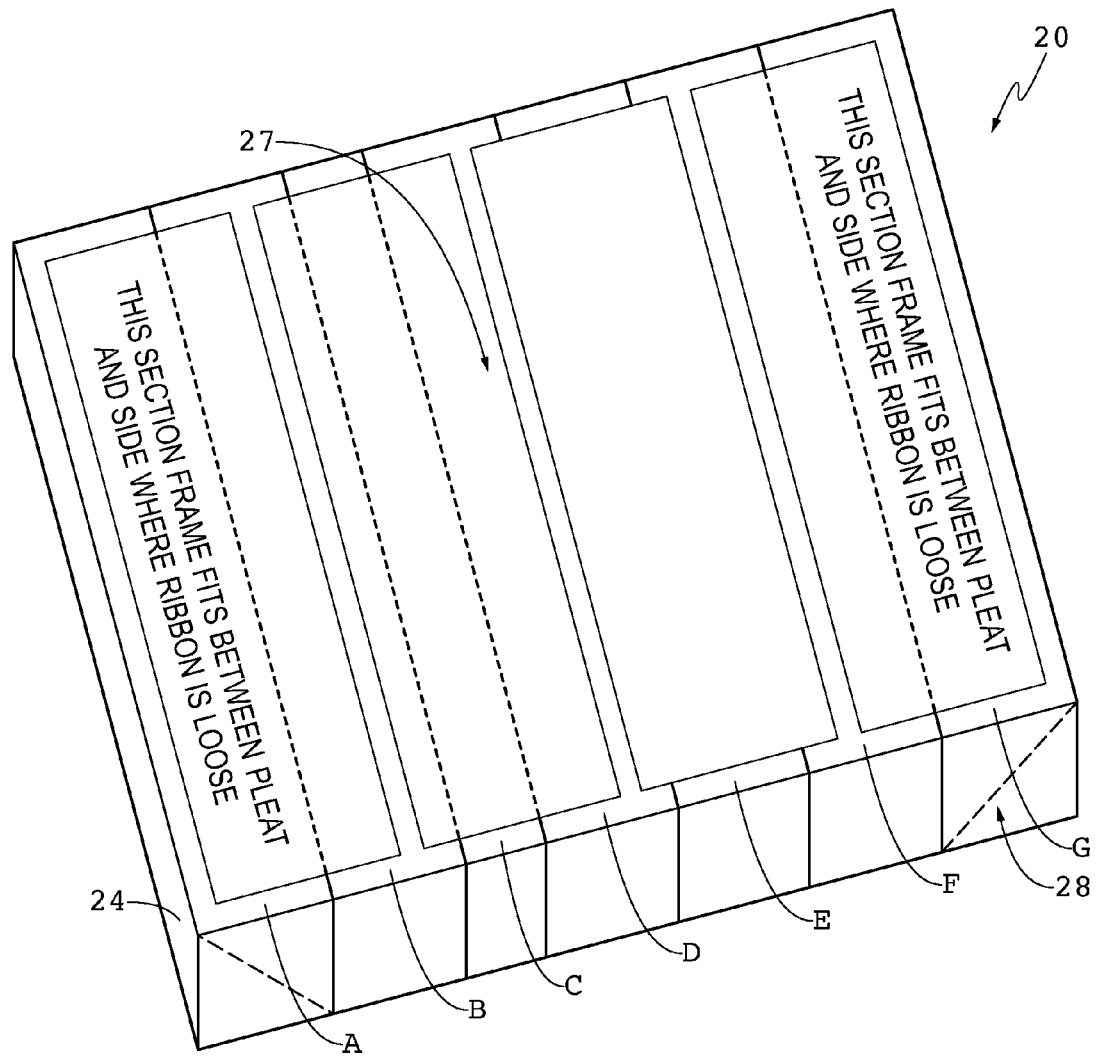
FIG. 5 is a schematic view in perspective illustrating the frame member in a constructed but pre-collapsed state.
Figure 6:
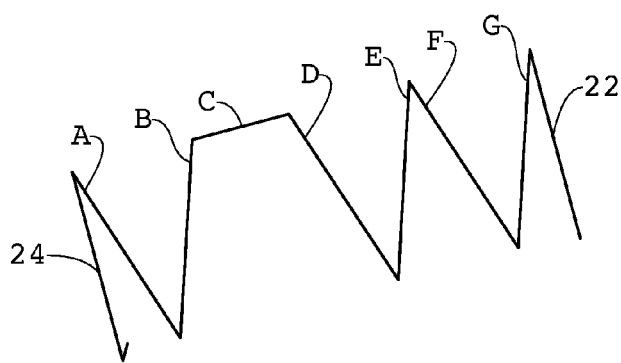
FIG. 6 is a schematic end view illustrating the collapsed configuration of the frame member.
Figure 7:
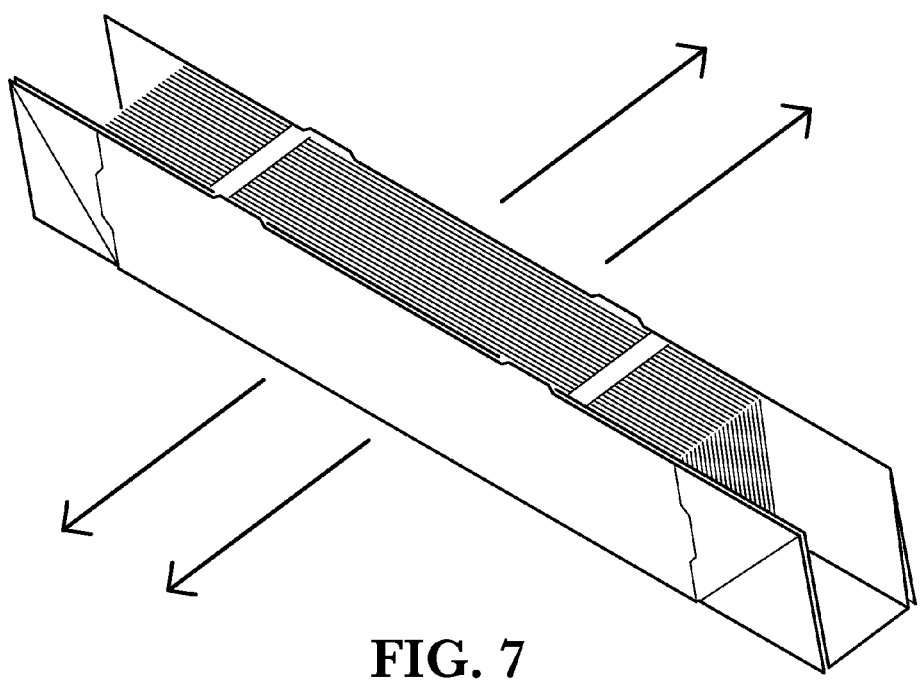
FIG. 7 is a view in perspective illustrating the collapsed frame member with pleated media assembly, and arrows indicating the direction of expansion.
Figure 8:
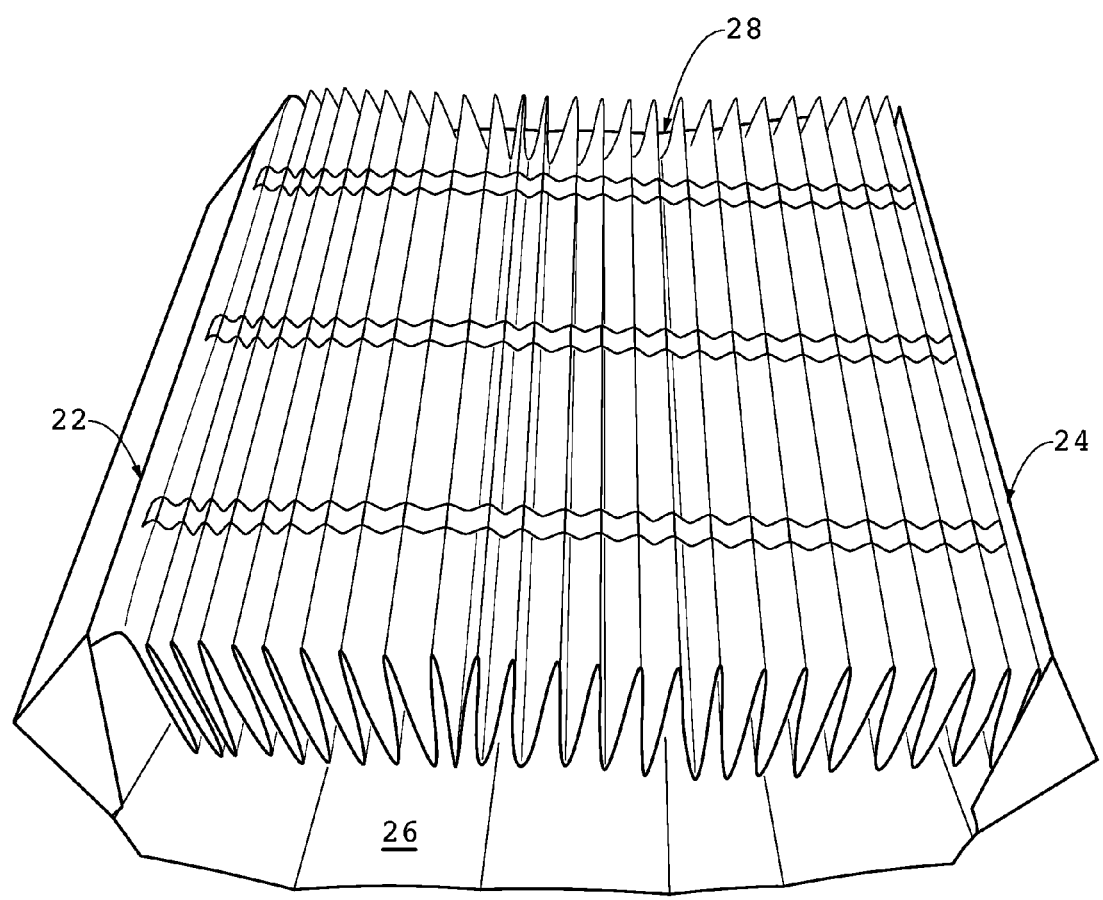
FIG. 8 is a view in perspective illustrating the mostly expanded frame member with pleated media assembly.

The frame member 20 is preferably formed from a single piece of planar paperboard, preferably in the shape shown in FIG. 4, but any suitable material will be acceptable. After forming, the frame member 20 is folded to form laterally opposite sidewalls 26 and 28 and longitudinally opposite end walls 22 and 24, all of which are generally perpendicular to a central area 27 (see FIG. 5). The frame member 20 is also folded in a novel way as described in detail below. Cutouts 25 are formed through the preferably paperboard of the central area 27 of the frame member 20 in a conventional manner, and thus provide openings through which air can flow when the completed filter 10 is in use.

In order to fold the frame member 20 to a desired, collapsed configuration, a series of folds are formed in the frame member, preferably by first scoring the frame member 20 along lines extending laterally across the frame member 20, such as the substantially parallel score lines 21 and 23, among others shown in FIG. 4. The score lines 21 and 23, along with all other score lines formed in the frame member 20, are conventional score lines. The scores can be cut scores, which are grooves formed by slicing into the material through a fraction of its thickness, such as about one-half. Alternatively, the scores can be perforations or they can be pressure scores that compress the material but do not cut into it. These score lines define hinge points that the frame member 20 folds along, and any particular filter can use one or more of these types of conventional scores depending upon the location and features desired.

The pleated media assembly 30 is a filtration media, preferably a synthetic non-woven filtration media having a thickness preferably less than one-eighth inch, a Frazier air permeability greater than about 100 cubic feet per minute (CFM) and a basis weight of from 30 to 120 grams per square meter. Of course, a person having ordinary skill in the field will understand that any suitable filtration media can be substituted for the preferred media with attendant benefits and disadvantages. The pleated media preferably has a conventional reinforcement layer to retain the pleated shape after pleating, and also to provide support to prevent the filtration media from "blowing out" of the filter frame during use. The reinforcement can be a conventional pleating reinforcement, such as slit and expanded metal or plastic, but it could also be netting, "chicken wire" or any conventional support layer. Alternatively, self-supporting pleatable material can be used. The pleated media assembly has end panels 32 and 34 (see FIG. 16) that are preferably formed of the longitudinal end panels of the pleated media, but could alternatively be constructed of the longitudinal end panels mounted to paperboard or other rigid material panels.

The frame member 20 and the pleated media assembly 30 are mounted to one another, preferably prior to collapse of the combination as shown in FIG. 1. In the preferred embodiment, the end panels 32 and 34 of the pleated media assembly 30 are mounted, preferably by adhering, to the end walls 22 and 24, respectively, of the frame member 20. In this manner the pleated media assembly 30 is fixed to the frame member 20 at each of their longitudinal ends, thereby maintaining the ends of each attached to one another to move simultaneously during collapse and expansion.

Figure 12:
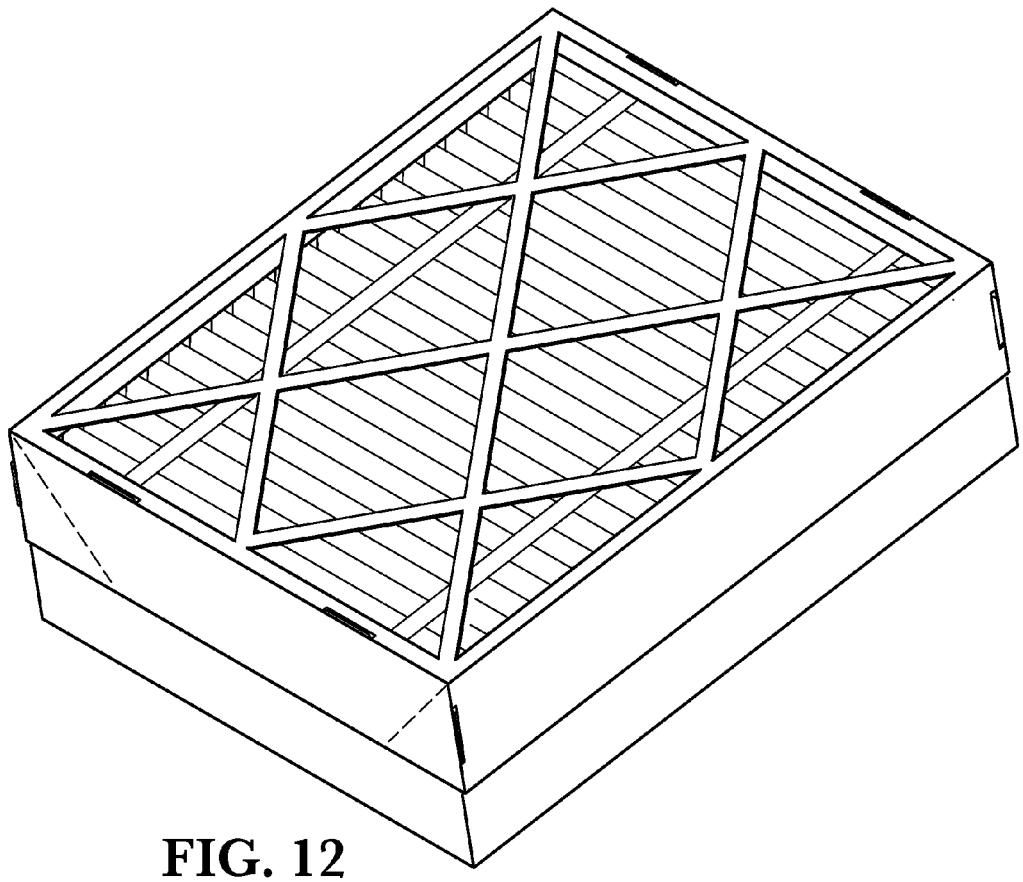
FIG. 12 is a view in perspective illustrating the expanded frame member in position on the expanded frame member with pleated media assembly.

The frame member 40 is preferably formed from a single piece of planar paperboard that is similar to the paperboard of the frame member 20, preferably in a shape similar to that shown in FIG. 4. Other suitable materials can be substituted. The member 40 also has cutouts 45 formed through the paperboard of a central area through which air will flow when the filter 10 is in use. The frame member 40 is slightly longer and wider than the frame member 20 so that the frame member 40 can be slid onto the frame member 20 in the manner of a gift box as shown in FIG. 12.

Figure 2:
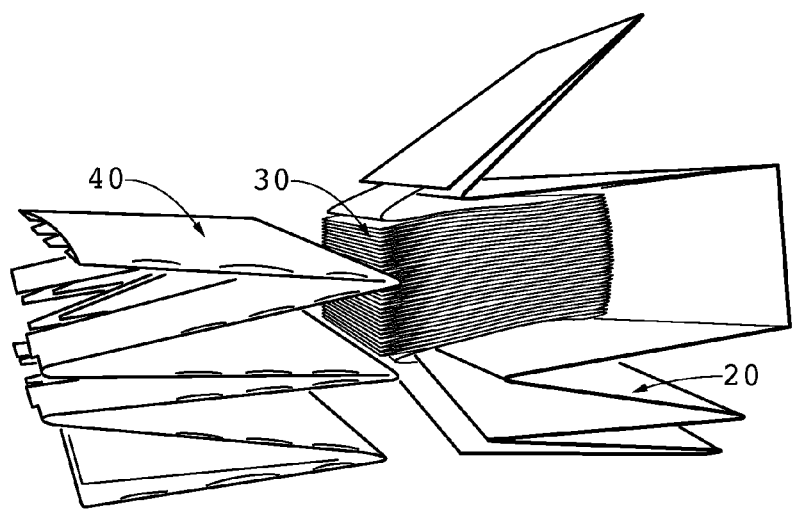
FIG. 2 is an end view illustrating the preferred embodiment of FIG. 1.
Figure 9:
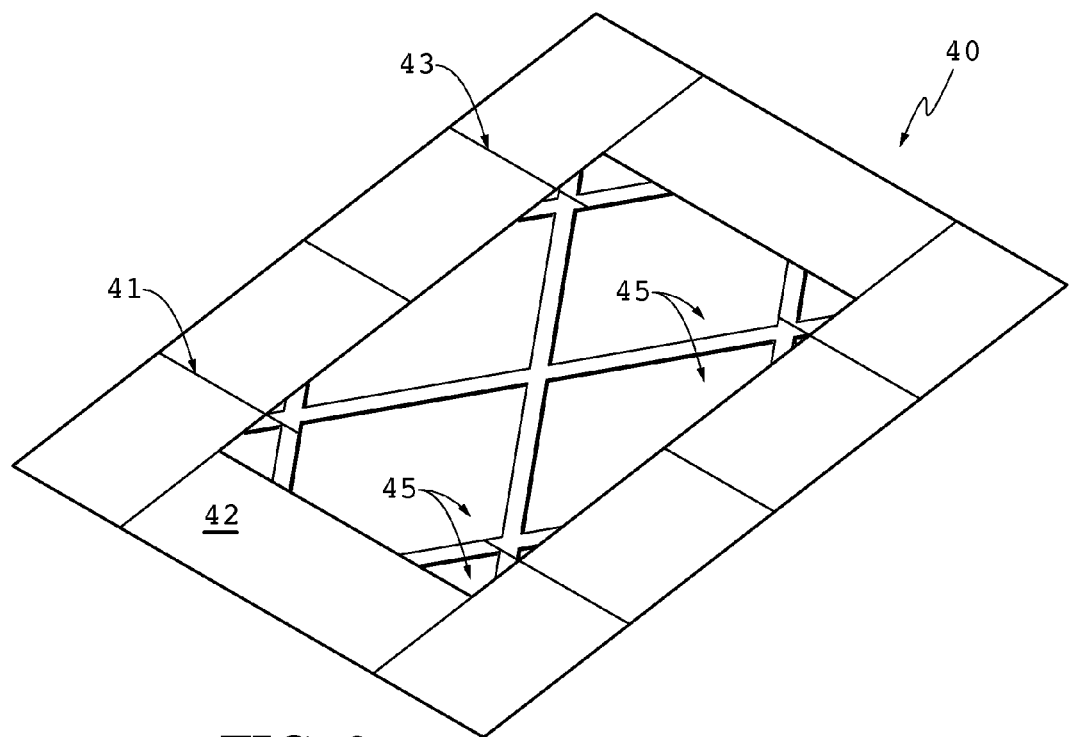
FIG. 9 is a view in perspective illustrating the mostly expanded frame member.
Figure 10:
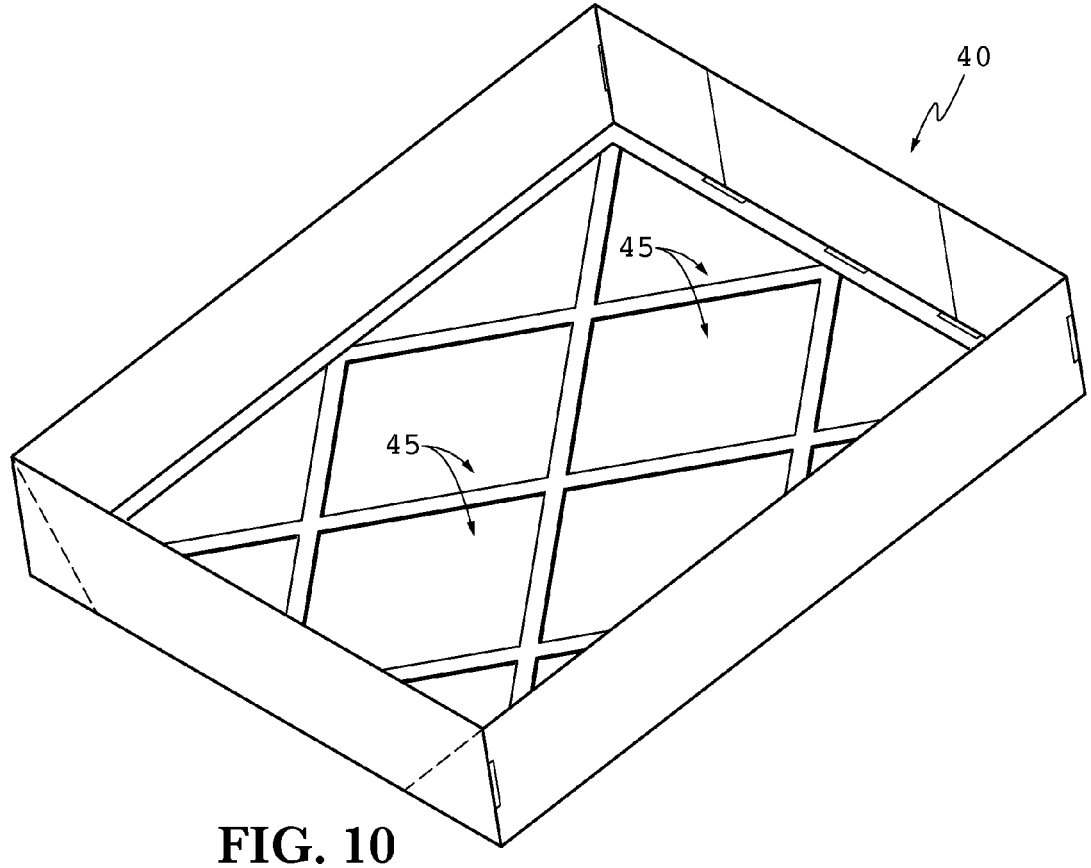
FIG. 10 is a view in perspective illustrating the expanded frame member.
Figure 11:
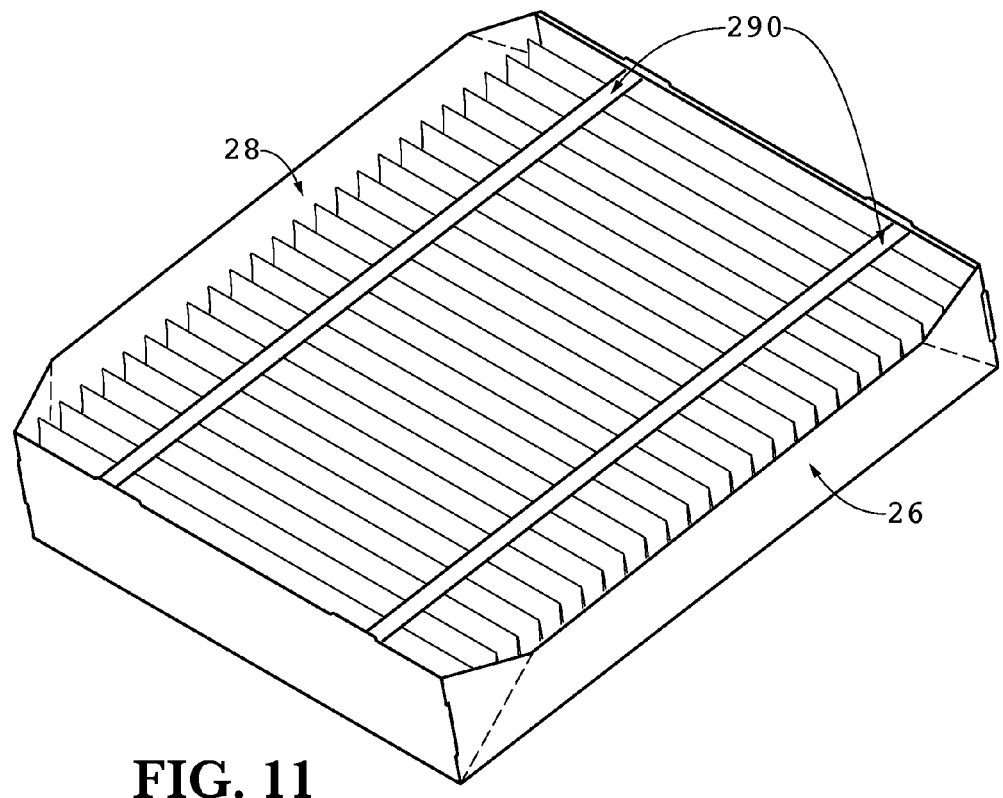
FIG. 11 is a view in perspective illustrating the expanded frame member with pleated media assembly.

After forming, the frame member 40 is folded and then glued to form side walls and end walls as shown in FIG. 10, and then is folded along substantially parallel lateral score lines 41, 43 and others to form the collapsed shape shown in FIGS. 1 and 2. In order to fold the frame member 40 to a desired configuration, a series of folds are formed in the frame member, preferably by first scoring the frame member 40 along lines, such as the score lines 41 and 43, among others, as shown in FIG. 9. The score lines 41 and 43, along with all other score lines formed in the frame member 40, are conventional score lines as described above.

The frame member 40 is designed to mount to the frame member 20 with tabs in one member inserting into slots in the other member to retain the mounting condition. For example, as shown in FIG. 1, the tabs 160 and 162 are formed on the top edges of the frame member's end wall 22. Corresponding slots 170 and 172 are formed at the base of the junction of the end wall 42 and the central area of the frame member 40. When the frame member 40 is placed over the frame member 20, the tabs 160 and 162 are inserted in the slots 170 and 172 to fix the frame members 20 and 40 together, particularly against any force in the pleated media assembly 30 that tends to return the pleated media assembly 30 toward its collapsed condition.

Similar tabs are formed at the corners of the frame member 20 (see tabs 164 and 166 in FIG. 16) and slots are formed at the corners of the frame member 40 (see slots 174 and 176 in FIG. 16). When the frame member 40 is placed over the frame member 20, the tabs 164 and 166 (along with other, similar tabs at the remaining corners) insert into the slots 174 and 176, respectively (along with other, similar slots at the remaining corners), to fasten the frame member 40 to the frame member 20.

In order to reduce the volume of the filter 10 prior to shipping, the combination of the frame member 20 and the pleated media assembly 30 is collapsed into a very compact structure in the configuration shown in FIGS. 1, 2, 3, 6 and 7 and In order to accomplish this collapsed condition, the frame member 20 is folded along the score lines 21 and 23, among others, with the end panels 32 and 34 of the pleated media assembly 30 attached to the end walls 22 and 24. Thus, the end walls 22 and 24 remain substantially parallel to one another and to the end panels 32 and 34, and the pleats of the assembly 30 are compacted between the two end walls 22 and 24, as shown in FIGS. 1, 2, 3 and 7.

During collapsing of the pleated media assembly 30 and the frame member 20, the location of each panel of the pleated media assembly 30 is designed to fit within the collapsed frame member 20, as will now be described with reference to the illustrations of FIGS. 3 through 6. As shown in the illustrations, the frame member 20 has end walls 22 and 24 to which the end panels 32 and 34, respectively, are mounted. One panel of the pleated media assembly 30 is inserted in the leftward most cavity of the frame member 20, and the end panel 32 is attached to the underside (in the orientation shown in FIG. 6) of the end wall 22. The remaining panels of the pleated media assembly 30 extend to the right in the orientation shown in FIG. 6. The first panel 33 (see FIG. 3, which is inverted relative to FIGS. 5 and 6) to the right of the end panel 32 extends over the frame member segments D, E, F and G, allowing the remaining panels of the pleated media assembly 30 to be held in a U-shaped channel formed by the end member segments B, C and D. The panel 34 extends from the large cluster of panels in the U-shaped channel to attachment to the end wall 24 of the frame member 20. Most of the panels of the pleated media assembly are compressed and inserted in the U-shaped channel that forms a larger cavity in the frame member 20. Preferably, there are no pleats of the pleated media assembly in the V-shaped channel rightward of the U-shaped channel, but the next rightward channel contains another panel of the pleated media assembly.

While the pleated media assembly 30 and the frame member 20 are collapsed in this configuration, the side walls 26 and 28 of the frame member 20 extend well beyond the lateral ends of the pleated media assembly panels. After expansion, the side walls 26 and 28 are bent upwardly to substantially perpendicular relative to the end walls 22 and 24, as shown in the progress from FIG. 8 to FIG. 11. It is preferred that during manufacture (and thus prior to expansion) of the combined frame member 20 and the pleated media assembly 30, the frame end walls 22 and 24 are mounted to the frame side walls 26 and 28 using adhesive, fasteners or other suitable means. The overlapping portions of the end walls and sidewalls are folded parallel to the respective end walls 22 and 24 when the structure is in its collapsed state, and when the structure is expanded those overlapping portions fold out and are coplanar to the sidewalls 26 and 28 (and thus perpendicular to the end walls 22 and 24).

It should be understood that the number of channels in the frame member 20 with and without pleated panels will be determined by the size of the filter and could differ from that shown. For example, smaller filters of the same height would have less folding and no channels without panels. Although a U-shaped channel is described above as containing most of the pleated panels of the pleated media assembly 30, it will become apparent to a person of ordinary skill that the shape of the channel containing the majority of the pleated panels is not critical. While the U-shaped channel has advantages, another shape could have most or many of those advantages while providing other advantages. Thus, a wide and deep V-shaped channel could be substituted for the U-shaped channel, as could a W-shaped channel or multiple adjacent or spaced V-shaped channels.

Figure 3:
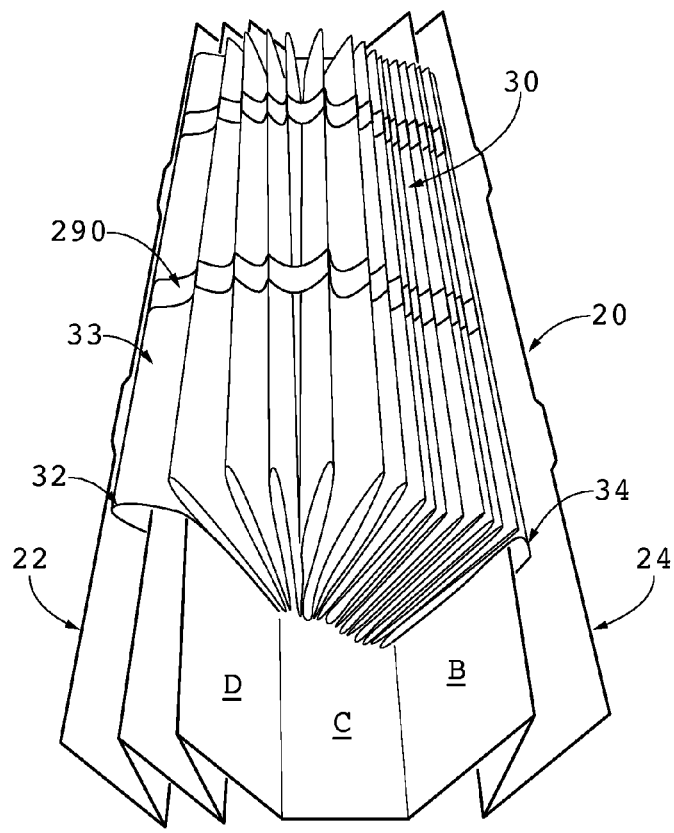
FIG. 3 is a view in perspective illustrating the collapsed frame member with pleated media assembly.

The collapsed configuration shown in FIGS. 1-3 allows the collapsed pleated media assembly 30 to be mounted in the collapsed frame member 20 during construction, and remain in this condition during shipping and subsequent storage of the components as long as the components are maintained in this condition, such as by bands, shrink wrap, boxes or any other suitable restraint. During expansion and assembly of the collapsed filter components, the frame member 20 and pleated media assembly 30 are expanded by longitudinal elongation. This can be accomplished by releasing the restraint on the collapsed combination and grasping the end walls 22 and 24 and manually forcing them apart from one another. This is carried out until the frame member 20 and pleated media assembly 30 reach a final length, which will be apparent due to the central area 27 attaining a substantially flat condition. The sidewalls 26 and 28 are then manually placed in the substantially perpendicular orientation relative to the central area 27. The second frame member 40 is then placed over the frame member 20 in the manner of a gift box as shown in FIG. 12 and the two frame members 20 and 40 are pushed together to create the filter assembly shown in FIG. 15.

When in the collapsed condition, the components of the filter 10 are packaged as tightly and small as feasible so that, during shipping and subsequent storage, they maintain their compact size and thus keep shipping and storage costs low. Once the filter 10 is removed from the packaging and expanded, the filter 10 consumes the same space of a conventional filter of its size, and operates to filter air in an HVAC system in a conventional manner—by filtering the air forced through the filter media thereof.

A preferred feature of the invention is flexible ribbons 290 (see FIGS. 3 and 11) of fabric, polymer strips, yarn or any other suitable flexible material that are attached, such as by adhesive, ultrasonic or thermal bonding or any other means, to the tips of the pleats where the edges of each pair of adjacent rectangular panels are joined. The ribbons 290 are used to maintain substantially consistent spacing between the tips of the pleats upon expansion, and to prevent excessive expansion of the pleated filter media assembly 30. A person having ordinary skill will understand from this description that other filter media materials can be used that do not require such ribbons 290, and that the ribbons 290 can be used on only one side of the pleated media assembly 30. Alternatively, it will become apparent that other means of spacing can be used, such as extending string through openings in the pleated filtration media, providing a traditional finger-like pleat separator made out of paperboard or plastic, or any other suitable spacing methods or any other suitable attachment means.

Figure 13:
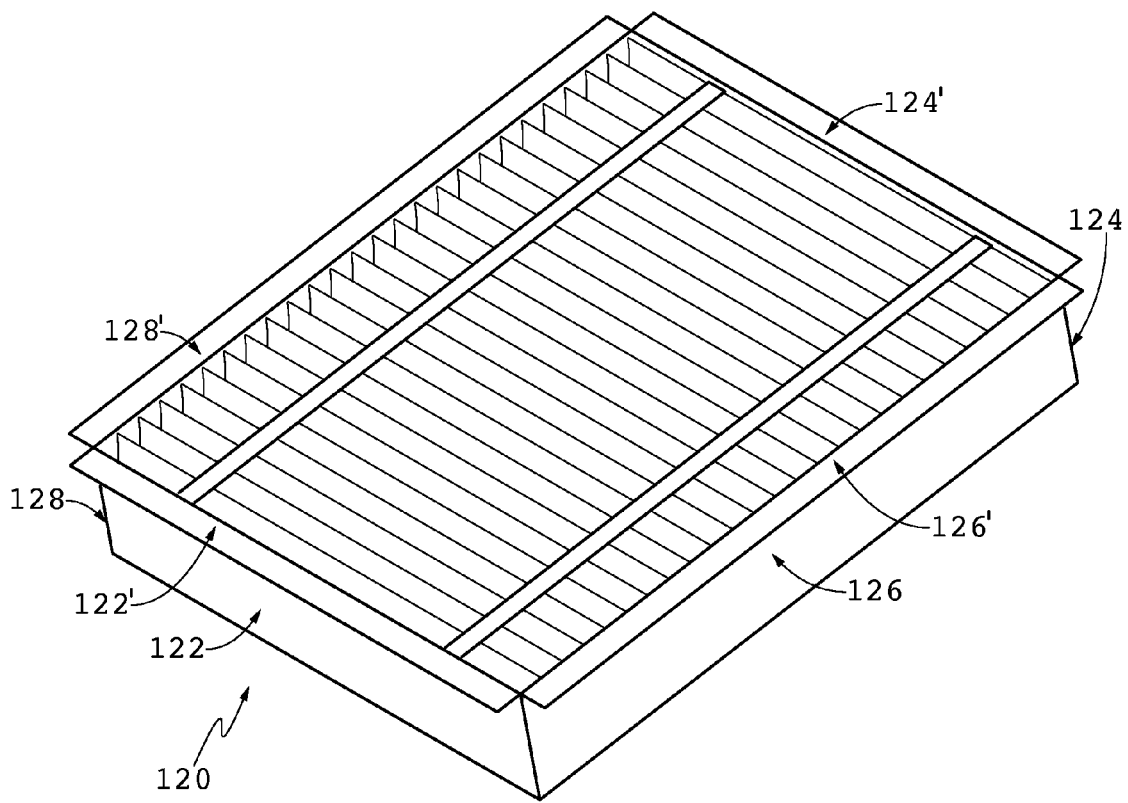
FIG. 13 is a view in perspective illustrating an alternative embodiment in which the frame member and pleated media assembly are expanded, and small flaps are upraised.
Figure 14:
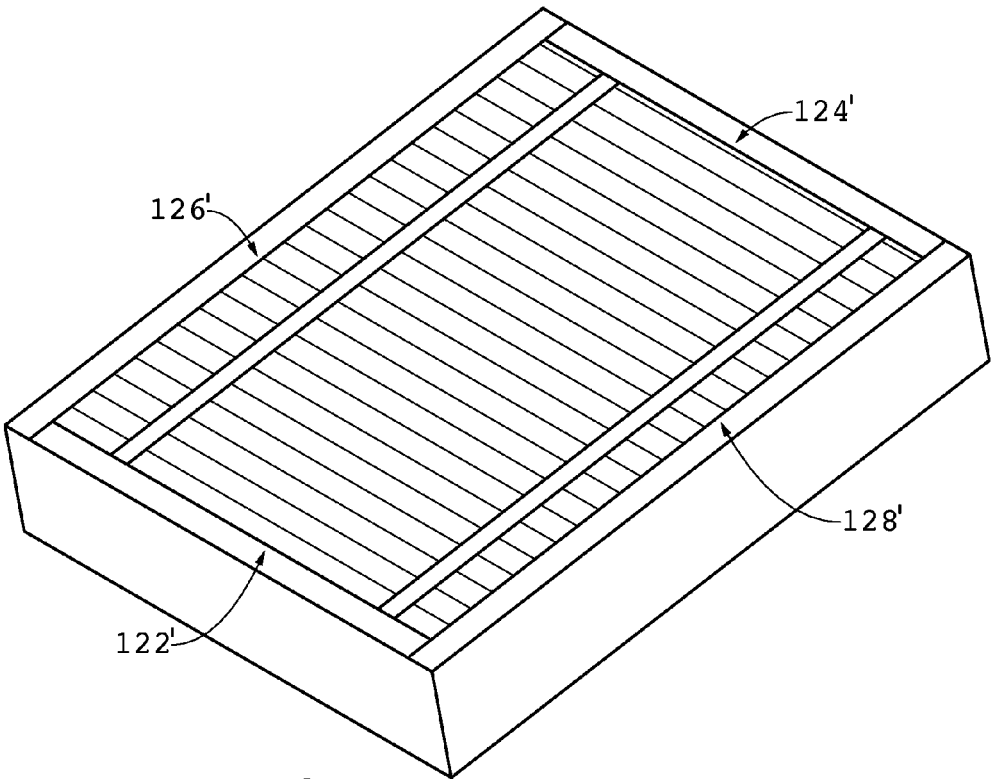
FIG. 14 is a view in perspective illustrating the embodiment of FIG. 13 with the flaps mounted in their final position.

An alternative embodiment of the present invention is shown in FIGS. 13 and 14. The frame member 120 is substantially identical to the frame member 20, with the exception of the panels 122', 124', 126' and 128' extending from the ends 122 and 124 and the sides 126 and 128, respectively. Upon expansion of the frame member 120 from the collapsed to the elongated state, the panels 122', 124', 126' and 128' are bent over to a substantially perpendicular orientation relative to the side walls or end walls from which they extend. Each of the panels 122', 124', 126' and 128' is fastened at its ends to next adjacent panels, such as by adhesive or some other suitable fastener. This alternative embodiment has the advantage that no second frame member is required to retain the pleated media assembly within the frame, because the panels 122', 124', 126' and 128' retain the pleated media assembly once they are fastened in their final position.

Figure 17:
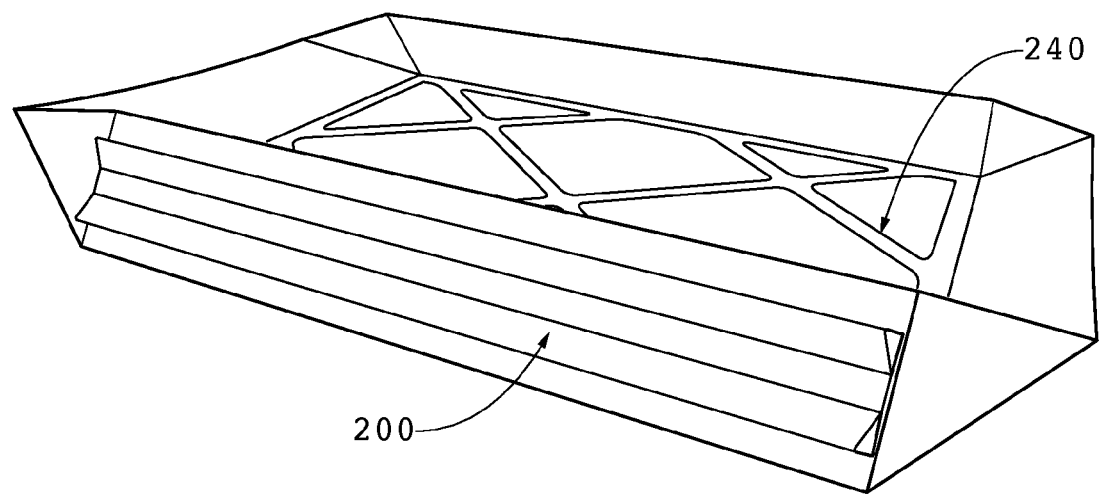
FIG. 17 is a view in perspective illustrating an alternative embodiment of the present invention.
Figure 18:
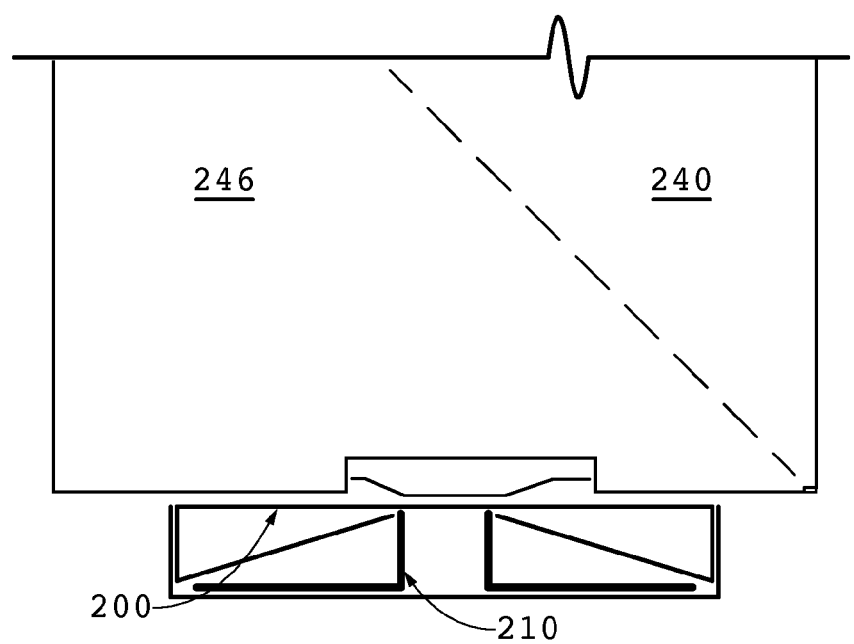
FIG. 18 is an end view illustrating the embodiment of FIG. 17.

As shown in FIGS. 17 and 18, a guide 200 can be integrated into, or attached to, the sidewall 246 of a second frame member 240. The second frame member 240 is preferably similar to the second frame member 40, described above, inasmuch as it has a planar central area with openings for air flow, along with sidewalls and end walls substantially perpendicular to the central area and that frictionally engage the sidewalls and end walls of a frame member substantially similar to the member 20 described and shown herein. The second frame member's 240 sidewalls form the outer lateral surface of the finished filter, and, therefore, the guide 200 extends from one sidewall 246 to engage a rail 210 in a conventional HVAC system. The guide 200 thus maintains the attached filter within the conventional HVAC system and reduces air bypassing the filter.

Figure 19:
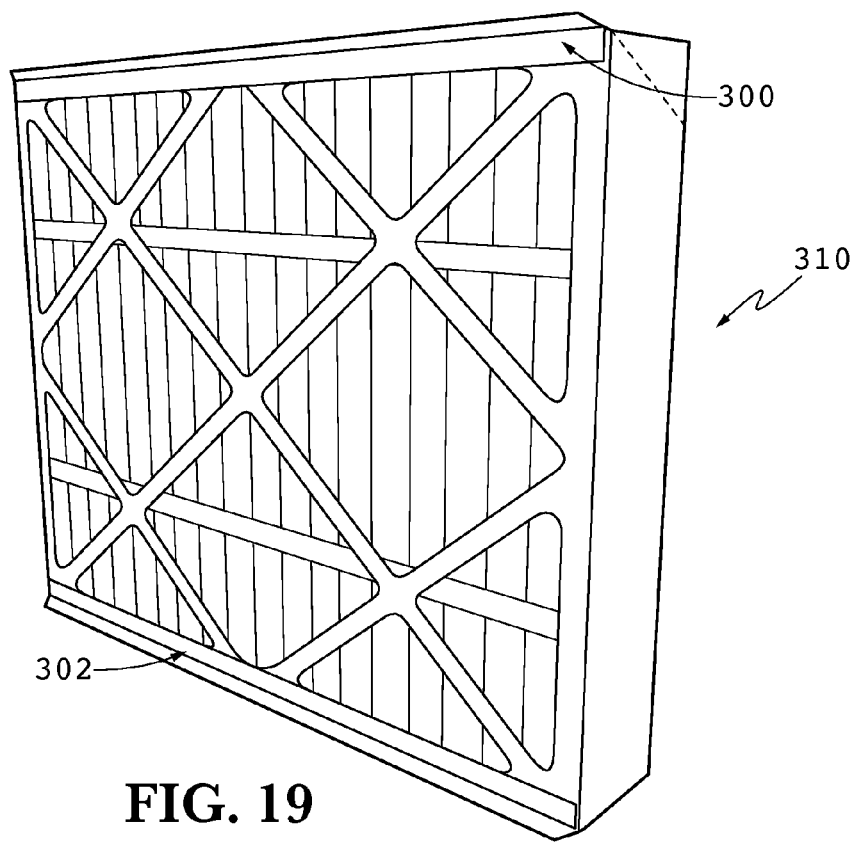
FIG. 19 is a view in perspective illustrating an alternative embodiment of the present invention.
Figure 20:
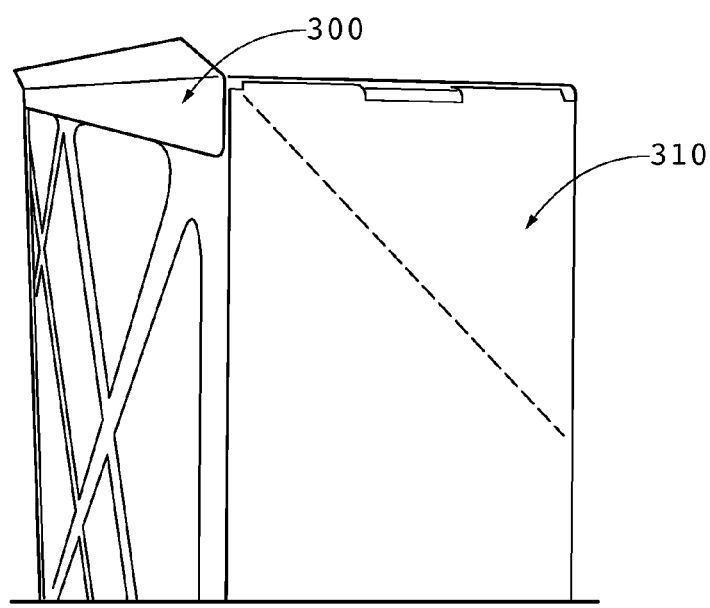
FIG. 20 is a view in perspective illustrating the embodiment of FIG. 19.
Figure 21:
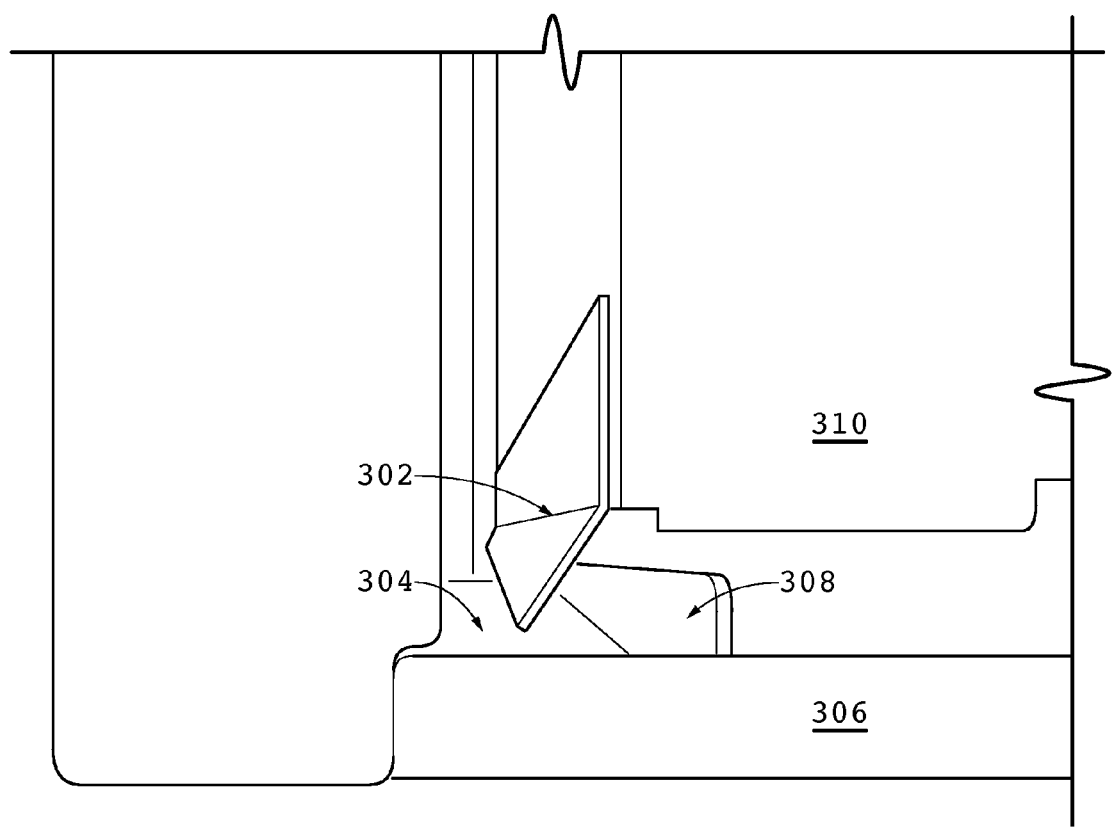
FIG. 21 an end view illustrating a magnified view of the embodiment of FIG. 19.

An alternative, or complement, to the guide 200 is shown in FIGS. 18 and 19. A flexible seal extension 300 is mounted at the top of the filter 310 on the upstream side and a similar flexible seal extension 302 is mounted at the bottom of the filter 310 on the upstream side. The seal extensions 300 and 302 are preferably either formed integral to the frame of the filter 310, or are mounted thereto, such as by double-sided tape, adhesive or any suitable fastener. The seal extensions 300 and 302 are preferably substantially L-shaped and the cantilevered leg of each can pivot away from the filter 310 to contact an adjacent surface of the HVAC structure that holds the filter 310, such as the floor 304 of the frame 306 (see FIG. 20) or the rail 308. This contact forms an air seal and an angled air guide that greatly reduces the amount of air that would, without the seal extensions, otherwise bypass the filter 310.

The seal extensions 300 and 302 are able to pivot relative to the filter 310 because the material of which they are constructed is deflected under the force of the air blowing through the structure holding the filter 310. If the material of which the seal extensions 300 and 302 is more rigid than would alone permit sufficient deflection, a "hinge" can be formed at the juncture of the legs that permits the cantilevered leg of each seal extension to pivot relative to the leg attached to the filter 310. Such a hinge is preferably formed by scoring the material of which the seal extension is constructed, but can also be formed by any known hinge.

In an alternative, the seal extensions 300 and 302 can be rigid and have no hinge to permit pivoting if they are constructed with precise size and orientation to seat against an adjacent surface to form a seal without such pivoting. Still further, seal extensions can be mounted to the downstream side of the filter 310.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A collapsible air filter comprising:

(a) an air filter media assembly comprising a plurality of generally rectangular panels interconnected together in a pleated configuration with each panel connecting to at least one adjacent panel at longitudinal panel edges, wherein one of the plurality of generally rectangular panels is a first filter media end panel located at a first end of the filter media and another of the plurality of generally rectangular panels is a second filter media end panel located at a second end of the filter media, wherein the first end of the filter media is opposite from the second end of the filter media;

(b) a filter frame member comprising first and second side walls and first and second end walls, each first and second side wall being connected to each first and second end wall to form a generally rectangular structure with a central area formed in the center of the generally rectangular structure, wherein the central area comprises at least one opening formed therein (c) wherein the filter media is attached to the filter frame member thereby forming the collapsible air filter, wherein the attachment of the filter frame member with the filter media comprises the first filter media end panel being mounted to the first end wall while the second filter media end panel is mounted to the second end wall, wherein the filter media is not adhered to the central area of the filter frame member and wherein the filter media is not adhered to the first and second side panels; and (d) the collapsible air filter comprises a collapsed condition and an expanded condition, wherein when the collapsible air filter is in the expanded condition the first sidewall, the second sidewall, the first end wall and the second end wall are foldable to positions angled to the central area and wherein when the collapsible air filter is in the collapsed condition the filter frame member and the air filter media are foldable in a generally pleated configuration.

2. The air filter in accordance with claim 1, further comprising a plurality of score lines extending laterally across the filter frame member to define hinge points for the filter frame member to fold along when the filter frame member is folded along with the pleated air filter media to the collapsed condition.

3. The air filter in accordance with claim 2, wherein, when the filter frame member is folded to the collapsed condition, a U-shaped channel is formed in which a majority of the panels of the pleated air filter media assembly are retained.

4. The air filter in accordance with claim 3, further comprising a second filter frame member configured to mount to the filter frame member, wherein the second filter frame member comprises first and second side portions and first and second end portions, wherein each of the first and second side portions is connected to each of the first and second end portions to form a generally rectangular portion with a central portion formed in the center of the generally rectangular portion, wherein the central portion comprises at least one open area formed therein, and wherein the first end portion, the second end portion, the first side portion and the second side portion are foldable to positions angled to the central portion, and wherein the second filter frame member being foldable to a collapsed condition.

5. The air filter in accordance with claim 3, wherein the filter frame member further comprises a plurality of frame panels wherein the frame panels extend from the first and second end walls and the first and second side walls, the frame panels being foldable over lateral and longitudinal edges of the pleated air filter media assembly when the collapsible air filter is in the expanded condition.

6. The air filter in accordance with claim 4, further comprising a guide mounted to one of the side portions to engage a filter mounting system.

7. A collapsed air filter comprising:

(a) an filter media assembly comprising a plurality of generally rectangular panels interconnected together in a pleated configuration with each panel connecting to at least one adjacent panel at longitudinal panel edges, wherein one of the plurality of generally rectangular panels is a first filter media end panel located at a first end of the filter media and another of the plurality of generally rectangular panels is a second filter media end panel located at a second end of the filter media, wherein the first end of the filter media is opposite from the second end of the filter media;

(b) a filter frame member comprising first and second side walls and first and second end walls, each first and second side wall being connected to each first and second end wall with a central area formed therebetween, wherein the central area comprises at least one opening formed therein, the filter frame member having a plurality of substantially parallel score lines extending laterally across the filter frame member to define hinge points for the filter frame member to fold along; and (c) wherein the filter media is attached to the filter frame member thereby forming the collapsible air filter, wherein the attachment of the filter frame member to the filter media comprises the first filter media end panel being mounted to the first end wall while the second filter media end panel is mounted to the second end wall, wherein the filter media is not adhered to the central area of the filter frame member and wherein the filter media is not adhered to the first and second side panels;

(d) the collapsed air filter comprises a collapsed condition, wherein when the collapsed air filter is in the collapsed condition, the filter frame member is folded along the hinge points such that the filter frame member and the air filter media are foldable in a generally pleated configuration and wherein when the collapsed air filter is in the collapsed position, a U-shaped channel is formed in the filter frame member such that a majority of the panels are retained in the U-shaped channel.

8. The air filter in accordance with claim 7, further comprising a second filter frame member configured to mount to the filter frame member wherein the second filter frame member comprises first and second side portions and first and second end portions, wherein each of the first and second side portions is connected to each of the first and second end portions with a central portion formed therebetween, wherein the central portion comprises at least one open area formed therein, and wherein the first end portion, the second end portion, the first side portion and the second side portion are foldable to positions angled to the central portion, and wherein the second filter frame member being foldable to a collapsed condition.

9. The air filter in accordance with claim 7, wherein the filter frame member further comprises a plurality of frame panels wherein the frame panels extend from the first and second end walls and the first and second side walls, the frame panels being foldable over lateral and longitudinal edges of the pleated air filter media assembly to positions angled to the central area when the collapsible air filter is in the expanded condition.

10. The air filter in accordance with claim 8, further comprising a guide mounted to one of the side portions to engage a filter mounting system.

11. A method of making an air filter comprising the steps of:
   (a) providing an air filter media assembly comprising a plurality of generally rectangular panels interconnected together in a pleated configuration with each panel connecting to at least one adjacent panel at longitudinal panel edges, wherein one of the plurality of generally rectangular panels is a first filter media end panel located at a first end of the filter media and another of the plurality of generally rectangular panels is a second filter media end panel located at a second end of the filter media, wherein the first end of the filter media is opposite from the second end of the filter media;
   (b) attaching the filter media to a filter frame member, the filter frame member comprising first and second side walls and first and second end walls, each first and second side wall being connected to each first and second end wall to form a generally rectangular structure with a central area formed in the center of the generally rectangular structure wherein the central area comprises at least one opening formed therein, wherein the first filter media end panel is mounted to the first end wall and the second filter media end panel is mounted to the second end wall, wherein the filter media is neither adhered to the central area of the filter frame member nor to the first and second side panels;
   (c) folding the filter frame member, along a plurality of substantially parallel score lines extending laterally across the filter frame member blank to define hinge points, to a collapsed condition in which a U-shaped channel is formed in the filter frame member; and
   (d) collapsing the filter media and disposing a majority of the panels of the filter media in the U-shaped channel, wherein when the collapsible air filter is in the collapsed condition the filter frame member and the air filter media are folded in a generally pleated configuration.

12. The method in accordance with claim 11, further comprising simultaneously elongating the filter frame member and the filter media while maintaining the first filter media end panel mounted to the first end wall and the second filter media end panel mounted to the second end wall.

13. The method in accordance with claim 12, further comprising folding frame panels, extending from the end walls and the side walls of the filter frame member, over lateral and longitudinal edges of the filter media to positions angled to the central area after the filter frame member and the filter media are elongated.

14. A collapsible air filter comprising:
   (a) an air filter media assembly comprising a plurality of generally rectangular panels interconnected together in a pleated configuration with each panel connecting to at least one adjacent panel at longitudinal panel edges, wherein one of the plurality of generally rectangular panels is a first filter media end panel located at a first end of the filter media and another of the plurality of generally rectangular panels is a second filter media end panel located at a second end of the filter media, wherein the first end of the filter media is opposite from the second end of the filter media;
   (b) a filter frame member comprising first and second side walls and first and second end walls, each first and second side wall being connected to each first and second end wall to form a generally rectangular structure with a central area formed in the center of the generally rectangular structure, wherein the central area comprises at least one opening formed therein;
   (c) wherein the filter media is attached to the filter frame member thereby forming the collapsible air filter, wherein the attachment of the filter frame member with the filter media comprises the first filter media end panel being mounted to the first end wall while the second filter media end panel is mounted to the second end wall, wherein the filter media is not adhered to the central area of the filter frame member and wherein the filter media is not adhered to the first and second side panels; and
   (d) the collapsible air filter comprises a collapsed condition and an expanded condition, wherein when the collapsible air filter is in the expanded condition the first sidewall, the second sidewall, the first end wall and the second end wall are foldable to positions angled to the central area and wherein when the collapsible air filter is in the collapsed condition the filter frame member and the air filter media are foldable in a generally pleated configuration.

* * * * *